Patented Mar. 26, 1935

1,995,412

UNITED STATES PATENT OFFICE 1,995,412

COLD MOLDING AND ROLLING FIBER PLASTIC

Clements Batcheller, Portsmouth, N. H.

No Drawing. Application January 12, 1934, Serial No. 706,336

18 Claims. (Cl. 106—24)

My invention relates to a new plastic which can be cold molded or rolled into sheet products having novel characteristics and also to the method of making such products and the products themselves.

Most of the mixtures now employed for cold molding contain relatively high percentages of cement of the hydraulic type which has the property of hardening for an indefinite period provided the necessary moisture is present to continue the chemical process involved.

Other cements commonly used as a base for cold molded or rolled products are plaster of Paris, Keene's cement and calcined magnesite when used as the basis of the oxychloride of "Sorrel" cement. Molded or rolled products containing the calcium cements are for the most part unsatisfactory due to their high degree of moisture permeability and their lack of structural strength. On the other hand, similar products made from cements of the "Portland" and straight calcined magnesite types present considerable difficulty in fabrication and use due to the characteristic properties of such cements of increasing in hardness and brittleness with age. The well known asbestos sheet products are of this type and consist substantially of a water mixture of hydraulic cement and mineral fibers felted upon a wet cylinder press or suction press and subsequently pressed to gauge.

While the outstanding defects of all asbestos sheets produced from cement and mineral fibers are their hardness and fragility which increase with age, it is also practically impossible to prevent warping and buckling of these products as the process of hydration continues. Again, the common product which is often used as heat insulation and exposed to high temperatures is not satisfactory for this purpose because it can withstand only moderately high temperatures and will crack when hot if water comes in contact therewith.

I find that these defects which are inherent in all of the aforesaid products of the prior art can be overcome by molding the products from a water plastic mixture of asbestos fibers, calcined magnesite and colloidal clay of the nature of Bentonite. Moreover by slight variations in the method of treating or curing sheet products made therefrom, wide variations in the physical characteristics of these products may be effected.

A typical formula from which I have produced my improved products is as follows:

Short asbestos fibers (waste fibers)___200 pounds
Calcined magnesite (200 mesh)_____ 40 pounds
Bentonite (colloidal clay, 200 mesh)__ 12 pounds
Water to plasticize_____ 20 gallons Depending upon the treatment given, sheet products formed from the above composition may have widely differing characteristics. For example, machine formed sheets which are subjected to substantial pressure in accordance with the usual procedure in the art if permitted to dry under normal room temperature for thirty-six hours, will acquire a structural strength which does not increase with age and which is sufficient to permit them to be worked and applied in the usual manner. Moreover, and due partly, I think, to the fact that Bentonite expands to many times its volume when wet and contracts when dry, and partly to the high fiber content of the product, these sheets are extremely porous and have a very low coefficient of heat transmission. Furthermore, they are not detrimentally affected by sudden and wide changes in temperature. Samples of such products have been heated to 1340° F. and plunged into cold water without any sign of spalling or crazing.

Because of their porosity and liquid absorbing capacity, the above products may be completely impregnated or colored, by mere immersion, with practically any liquid or any substance which can be liquefied either by heat or appropriate solvents. By simple immersion in a water solution of aniline dye the product may be cheaply and attractively colored and it may be kept in its original porous condition by prompt drying after the coloring is completed. On the other hand, as will be later pointed out, a hardened, substantially non-porous colored sheet may be produced by allowing the water of the dye solution to remain until the calcined magnesite is completely hydrated.

Where a highly impervious, water-proof product is desired, it may be impregnated with wax, resin, pyroxylin lacquer, asphalt, rubber, mineral or vegetable oil or any like composition. Sheets impregnated with the cheaper oxidizable vegetable oils such, for example, as raw linseed oil produce a product entirely new in the art and which cannot be produced from a standard cement asbestos base. Due to the additional bonding properties of the hardened oil or other impregnating compound both in the interstices and on the surface of the product, its strength and integrity is very substantially increased.

So-called "ebony" board and "ebony" molded products are well known commercially, and are used largely in the electrical art because of their high dielectric strength. Such products are either rolled or molded from a plastic mixture of Portland cement and asbestos fiber and thereafter impregnated with a heated solution of Gilsonite. Due to the density of the material and its resistance to impregnation, the process is necessarily conducted in an autoclave under a heavy pressure of carbon dioxide. Obviously, the procedure is slow and expensive, and where the product is required to have a deep black finish it must subsequently be sprayed with a non-conducting black lacquer.

From my primary, porous sheet product a very superior "ebony" board can be produced by simply immersing it in a solution of Gilsonite dissolved in an appropriate hydrocarbon solvent which, upon evaporation, will leave the asphalt in the interstices of the product and greatly increase its structural strength. Where a deep black finish is desired, my porous product is first impregnated or colored with an aniline black, such as Carbanthrene black, and thoroughly dried before treating with the Gilsonite.

Although having the same composition as my primary porous product above described and which can be readily impregnated with various substances, a product widely differing therefrom in its physical characteristics can be produced by a slight variation in treatment or by further treatment of the primary product, in the manner following.

If the primary product in which the hydration has been arrested by subjecting the product to an air drying treatment for say thirty-six hours is again thoroughly wetted and subjected to the usual "moist room" curing treatment given the ordinary cement asbestos products, it will, at the end of six days, acquire its maximum structural strength, which is very high, and it will become hard, dense and substantially non-porous. In these respects it resembles the ordinary cement asbestos product which, however, requires about twenty-eight days to develop the proper degree of structural strength. If, instead of first forming a porous product by arresting the hydration, this step is omitted and the molded or rolled product is subjected to the usual moist curing process, a hard, dense product is produced.

It will be quite apparent to those versed in the art that the colloidal clay, Bentonite, plays a very important part in attaining the unique and advantageous properties which characterize my invention. To a very large degree it makes possible the extremely porous primary product and imparts much of the structural strength thereto as well as serving as a perfect lubricant in obtaining a workable degree of plasticity in the fiber-magnesite mixture. It eliminates from the finished product that extreme hardness and brittleness which would otherwise be present with a straight calcined magnesite cement binder.

In the finished product it serves as a perfect lubricant for such fabricating or finishing operations as drilling, tapping, threading, grinding or machining, and my products may be worked on any metal or wood working machine with the same facility as the materials usually worked thereon. This is not true of the common cement-asbestos products.

In forming my products by molding or rolling I have found that the use of Bentonite produces a smooth glossy surface thereon which is capable of taking and retaining a very high polish when properly buffed either wet or dry, and that it greatly enhances the surface finish of all products made.

As distinguished from the common cement-asbestos products, my products even when very thin show no tendency whatever to warp or buckle when moist or wet and, instead of being hard-brittle, they are comparatively strong and tough and do not increase in hardness and fragility with age.

Utilizing my composition and method of procedure, a non-warping asbestos sheet product of very high porosity and consequently having high thermal insulating qualities combined with high structural strength and easy working qualities can be produced in about thirty-six hours. On the other hand, a dense, substantially non-porous product simulating the common cement-asbestos product, but without its inherent defects, can be made in about six days.

The typical formula given above is to be understood as only representative of my compositions and products and I desire to make it perfectly clear that changes in the ingredients and in the proportions thereof which do not substantially affect the desirable features of my invention may be made.

For example, the structural strength of my products will vary with the fiber content, and if greater strength (indicated by a higher modulus of rupture) is desired, the fiber content may be substantially decreased. Where less strength is required the fiber content may be increased.

While Portland cement is probably accountable for many of the defects in the present cement-asbestos products, I find that, within certain limits, the calcined magnesite of my compositions may be replaced in part by Portland cement without detrimentally affecting the physical characteristics of my products made therefrom. However, where more than one-third of the calcined magnesite is thus replaced, the products are undesirably hard and brittle.

I prefer to keep the proportion of Bentonite to calcined magnesite about as given in the formula because any substantial reduction in the Bentonite content effects a corresponding increase in hardness in the finished product and detrimentally affects its working qualities.

It is to be understood that the word "molded" where used in the claims, includes "rolled" as an equivalent, and that the words, "magnesium hydrate" may include either partially or completely hydrated calcined magnesite, or both.

What I claim is:

1. A molding composition comprising asbestos fibers, colloidal clay of the character of Bentonite, calcined magnesite and Portland cement; the ratio of the magnesite to the Portland cement being at least two to one, by weight.

2. A molded product of the cement-asbestos type characterized by its porosity and its capacity to absorb liquids, whereby it is susceptible to impregnation with various substances in liquid, liquid mixture and liquid solution form, and comprising, by weight, a major portion of asbestos fibers, a minor portion of colloidal clay of the character of Bentonite, and an intermediate portion of partially hydrated calcined magnesite.

3. The method of making a product of the character described which comprises forming the product under substantial pressure from a water plastic mixture comprising asbestos fibers, calcined magnesite and colloidal clay of the character of Bentonite, and drying in air before the magnesite is completely hydrated.

4. The method of making a product of the character described which comprises forming the product under substantial pressure from a water plastic mixture comprising asbestos fibers, calcined magnesite and colloidal clay of the character of Bentonite, drying the formed product before the magnesite is completely hydrated, rewetting the dried product, and thereafter curing in a moist atmosphere.

5. The method of making a waterproof product of the character described which comprises forming the product under substantial pressure from a water plastic mixture comprising asbestos fibers, calcined magnesite and colloidal clay of the character of Bentonite, drying the product before complete hydration thereof has taken place, and thereafter impregnating it with a waterproofing substance.

6. The method of making a waterproof product of the character described which comprises forming the product under substantial pressure from a water plastic mixture comprising asbestos fibers, calcined magnesite and colloidal clay of the character of Bentonite, drying the product before complete hydration thereof has taken place, and thereafter impregnating it with Gilsonite.

7. A molding composition comprising, by weight, a major portion of asbestos fibers, and minor portions of calcined magnesite and colloidal clay of the character of Bentonite.

8. A molding composition comprising, by weight, a major portion of asbestos fibers, and minor portions of calcined magnesite and colloidal clay of the character of Bentonite; the colloidal clay being in excess of 20% of the weight of the magnesite.

9. An easily-workable but hard, molded product of the character described composed principally of asbestos fibers with a binder of magnesium hydrate and colloidal clay of the character of Bentonite.

10. A hard but easily workable, molded product of the character described comprising, by weight, a major portion of asbestos fibers, and minor portions of magnesium hydrate and colloidal clay of the character of Bentonite; the magnesium hydrate being substantially in excess of the Bentonite.

11. A hard but easily workable, molded product of the character described comprising a base containing, by weight, a major portion of asbestos fibers, and minor portions of magnesium hydrate and a colloidal clay of the character of Bentonite impregnated with a waterproofing composition.

12. A hard but easily workable, molded product of the character described comprising, by weight, a major portion of asbestos fibers, and minor portions of colloidal clay of the character of Bentonite, magnesium hydrate and Portland cement; the ratio of the magnesium hydrate to the Portland cement being at least two to one, by weight.

13. A hard but easily workable molded product of the character described which is substantially impervious to moisture comprising a base containing, by weight, a major portion of asbestos fibers, and minor portions of magnesium hydrate and colloidal clay of the character of Bentonite; said base being impregnated with a waterproofing substance selected from the group—Gilsonite, raw linseed oil.

14. The method of making a product of the character described which comprises forming the product from a water plastic mixture comprising a major portion of asbestos fibers, and minor portions of calcined magnesite and colloidal clay of the character of Bentonite, and drying.

15. The method of making a hard but easily workable product of the character described which comprises forming the product under substantial pressure from a water plastic mixture comprising a major portion of asbestos fibers, and minor portions of calcined magnesite and colloidal clay of the character of Bentonite, and drying.

16. The method of making a hard but porous, workable product of the character described, which comprises forming the product under substantial pressure from a water plastic mixture comprising asbestos fibers, calcined magnesite and colloidal clay of the character of Bentonite, and drying in air before the magnesite is completely hydrated.

17. The method of making a hard, comparatively dense, but easily workable product of the character described which comprises forming the product under substantial pressure from a water plastic mixture comprising a major portion of asbestos fibers, and minor portions of calcined magnesite and colloidal clay of the character of Bentonite, and curing in a moist atmosphere.

18. A molded product of the character described comprising, by weight, a major portion of asbestos fiber, a minor portion of colloidal clay of the character of Bentonite, and an intermediate portion of magnesium hydrate.

CLEMENTS BATCHELLER.